July 25, 1933.                    W. F. MacGREGOR ET AL                    1,919,440
COMBINATION HARVESTER THRESHER
Original Filed March 21, 1925
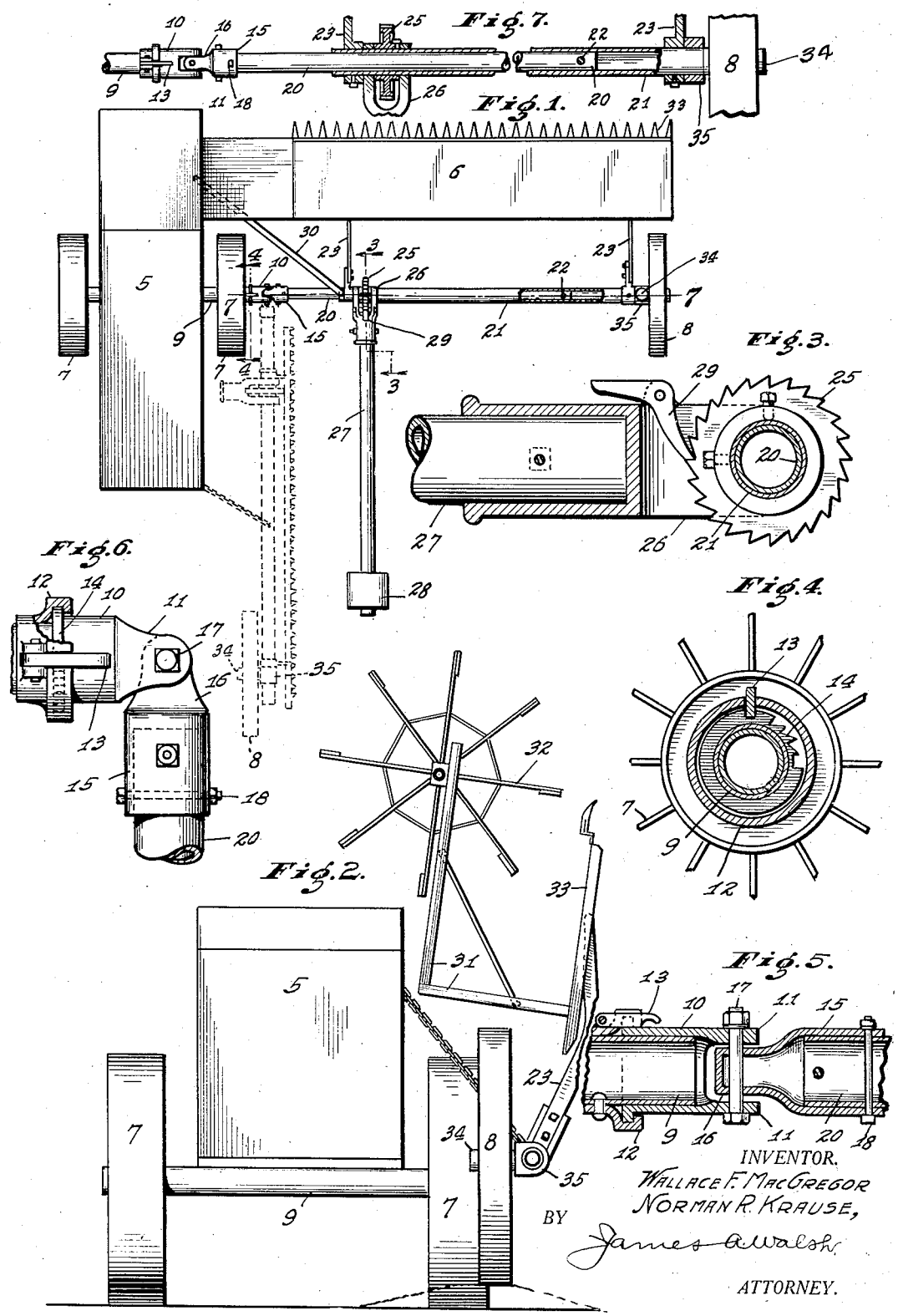
INVENTOR.
WALLACE F. MacGREGOR
NORMAN R. KRAUSE,
BY James A. Walsh
ATTORNEY.

Patented July 25, 1933

1,919,440

UNITED STATES PATENT OFFICE

WALLACE F. MacGREGOR AND NORMAN R. KRAUSE, OF RACINE, WISCONSIN, ASSIGNORS TO J. I. CASE COMPANY, OF RACINE, WISCONSIN, A CORPORATION

COMBINATION HARVESTER-THRESHER

Application filed March 21, 1925, Serial No. 17,380. Renewed December 17, 1932.

Combination harvester-threshers, as commonly assembled, are of such width that it becomes necessary to detach the harvester so that the thresher may travel through narrow passageways, as gates and over bridges, while the harvester is usually placed upon a vehicle to be trailed behind the thresher or transported separately therefrom, which method is both laborious and slow and requiring attendants for loading and unloading the harvester. Our object is to provide means for folding the harvester closely alongside the thresher and in such position in relation thereto that the minimum of space will be occupied by the harvester and thus materially reduce the width of the machine as a whole to permit its entrance in assembled form through ordinary passageways, and which may be accomplished by a limited number of attendants, as will be apparent from the following description.

In the accompanying drawing, forming part hereof, Figure 1 is a plan of a combination harvester-thresher with our improvement applied thereto, certain operating elements being omitted for purposes of clearness; Fig. 2 an end elevation showing the harvester assembled alongside the thresher; Fig. 3 a detail of mechanism which we employ for vertically adjusting the harvester taken on the dotted line 3—3 in Fig. 1; Fig. 4 a detail of parts cooperating with those illustrated in Fig. 3; Fig. 5 an enlarged detail of a flexible coupling connecting the thresher and harvester to permit vertical adjustment thereof; Fig. 6 a detail showing our improved coupling in position for swinging the harvester alongside the thresher; and Fig. 7 a longitudinal sectional view through the axle structure which we employ, taken on the dotted line 7—7 in Fig. 1.

In said drawing the portions marked 5, 6, indicate the thresher and harvester, respectively, and 7, 8, the carrying wheels thereof, all of which may be of any appropriate construction. As illustrated, the thresher axle, 9, is provided with a coupling member, 10, terminating in knuckles, 11, said member being mounted in a flanged bearing, 12, embodying a latch, 13, adapted to engage a ratchet, 14, surrounding said coupling and retained by flange 12 as shown in Fig. 5. While we have shown said coupling member attached to axle 9 it will be understood that where practicable it may be secured to other portions of the thresher. A coupling member, 15, embodying a knuckle, 16, is connected to knuckles 11 by a pintle, 17, and connected by a bolt or pin, 18, to axle, 20, mounted at its outer end in wheel 8 for sustaining the harvester. Said axle 20 is mounted in a rotatable sleeve, 21, which directly supports harvester 6 through the arms, 23, fixedly secured to said sleeve, and upon which arms are mounted the usual framework, 31, reel, 32, cutting mechanisms, 33, and other accessories commonly employed. Fixedly secured to said sleeve 21 is a ratchet, 25, between the bifurcated end of socket, 26, to which is connected an arm, 27, having a weight, 28, at its outer end, constituting the counterbalancing weight common to such machines. It will be understood, of course, that the harvester and thresher elements may be connected by means other than the coupling described, such as the brace, 30, or otherwise; and that suitable mechanism under control of an operator on the thresher is installed between it and the harvester whereby the latter may be raised and lowered, as the machine is moving through the field, by means of its flexible connection through sleeve 21 on axle 20, but as said controlling mechanism forms no part of our improvement an illustrated example thereof is not here considered necessary.

When it is desired to fold the machine a pin, 22, is inserted through sleeve 21 and axle 20, the harvester controlling mechanism (not shown) is detached, and the counterbalancing weight 28 removed, when the arm 27 embodying pawl, 29, is given a pumping action, causing said pawl to actuate ratchet 25 in a well known manner, with the effect of rotating sleeve 21 and axle 20, thus gradually turning harvester 6 about this axis until it assumes the position vertically shown in Fig. 2. When thus rotating axle 20 and raising harvester 6 said axle is held from reverse rotation by ratchet 14 and latch 13 associated with coupling member 10, which latch is disengaged from its initial seat shown in Fig. 4 to engage by gravity with ratchet teeth 14 as the same rotate, and when said axle with its coupling have rotated about ninety degrees the pintle 17 has assumed vertical position as shown in Fig. 5, so that when the harvester has been elevated in the manner described the arm 27 is removed, when said harvester and its connections may be swung horizontally alongside the thresher as indicated by dotted lines in Fig. 1, the wheel 8 assisting in such adjustment, and upon the accomplishment of which said wheel may be swung around a pivot, as stub, 34, for illustration, on collar, 35, and thus caused to lie parallel with the thresher wheels in the line of travel of the machine, as indicated in Fig. 2.

As shown in Fig. 1, the harvester platform 6 is mounted on the support or axle structure 21 in offset relation thereto, and, as the axle is connected to the thresher by means which permits it to rock, the weight of the harvester produces a torsional effect upon the axle. The axle or other support must necessarily be of a strong and effective character to withstand such torsional strain and to steadily support the heavy harvester platform in stable horizontal position for proper grain cutting operations, and, by employing suitable mechanism, such as the weighted arm 27 or its equivalent, at any point along the full length of the torsional support (or upon the harvester itself when practicable), a counterbalancing effect is produced for maintaining the equilibrium of the harvester and to sustain it in normal cutting position.

We claim as our invention:

1. In a combination harvester-thresher, an axle supporting said harvester and connected to said thresher, means in said axle whereby said harvester may be swung alongside said thresher, and mechanism associated with said axle between its outer end and its connection with a thresher for transposing said harvester from horizontal to vertical position to lie in close proximity to said thresher.

2. In a machine of the class described, a thresher, a support rockingly connected to said thresher, arms secured to said support and movable therewith, a harvester connected to said arms and adapted to move vertically when said support is rocked, and means connected to said support between its outer end and its connection with a thresher for transposing said harvester from horizontal field working position to edgewise position to be folded alongside said thresher.

3. In a machine of the class described, a thresher, a support rockingly and foldingly connected to said thresher, a harvester connected to said support, and means connected to said support between its connection with the thresher and its outer end for transposing said harvester from horizontal to edgewise position.

4. In a combination harvester-thresher, supporting means connecting said thresher and harvester whereby the harvester may be adjusted vertically and horizontally, means between the outer end of said supporting means and its connection with a thresher for turning said supporting means to position said harvester vertically, and means associated with said turning means for preventing reverse movement of said supporting means when turning said harvester.

5. In a combination harvester-thresher, an axle connecting said elements, a harvester supported on said axle, ratchet mechanism associated with said axle between the outer end of the latter and its connection with a thresher for raising said harvester from horizontal to edgewise position, and means for preventing reverse rotation of said axle while transposing said harvester from one position to another.

6. In a combination harvester-thresher, an axle connecting said elements, a harvester supported on said axle, mechanism associated with said axle between its outer end and its connection with a thresher for rotating the axle to raise said harvester from horizontal to edgewise position, and mechanism for preventing reverse rotation of said axle.

7. In a machine of the class described, a thresher, a harvester, means for supporting the harvester and foldingly connecting said elements, and means on the supporting means between its outer end and connection with the thresher for transposing said harvester from horizontal to edgewise position to be folded alongside said thresher for reducing the width of said machine.

8. In a machine of the class described, a thresher, a harvester, means for supporting the harvester and connecting said elements, means on the supporting means between its outer end and connection with the thresher for transposing said harvester from horizontal to edgewise position, and means associated with said transposing means for counterbalancing the offset weight of said harvester to facilitate regulation of its height of cut.

9. In a combination harvester-thresher, the combination of a thresher support, an axle extending laterally from said thresher support and provided at its outer end with a grain-wheel, a connection between said thresher support and said axle whereby the axle may oscillate in a vertical plane to allow the grain-wheel to follow ground irregularities and also permitting rearward folding of the axle alongside the thresher, and a harvester platform normally in advance of the axle and so supported thereby as to permit raising and lowering of the platform to regulate the height of cut and also so connected to the axle between the outer end of the latter and its connection with the thresher that said platform may be tilted up into edgewise position thereby to still further reduce the width of the machine when the axle is folded.

10. In a combination harvester-thresher, the combination of a thresher support, an axle extending laterally from said thresher support and provided at its outer end with a grain-wheel, a connection between said thresher support and said axle permitting oscillation of the axle in a vertical plane to allow the grain-wheel to follow ground irregularities and also permitting rearward folding of the axle alongside the thresher, and a harvester platform normally in advance of the axle and so supported thereby as to permit raising and lowering of the platform to regulate the height of cut and also so connected to the axle between the outer end of the latter and its connection with the thresher that the harvester may be tilted up into edgewise position thereby to reduce the width of the machine when the axle is folded, the arrangement being provided with means for counterbalancing the offset weight of the harvester platform to facilitate regulation of the height of cut.

11. In a machine of the class described, a harvester, a thresher, coupling members connected to said elements, a pintle uniting said coupling members and positioned horizontally therebetween, and means between the outer end of the harvester and its connection with the thresher for raising the harvester in edgewise position and causing said pintle to assume vertical position whereby the harvester may be swung horizontally in relation to the thresher.

12. In a machine of the class described, a thresher, a rocking torsionally acting supporting member, a harvester platform connected to said support and maintained in horizontal cutting position by the torsional force of said support, flexible means connecting the support to the thresher, mechanism connected to the harvester for counterbalancing the offset weight thereof and sustaining the harvester in normal cutting condition, and means associated with said support between its outer end and its connection with a thresher for transposing a harvester from horizontal to edgewise position.

13. In a machine of the class described, a thresher, a hinge member secured to the thresher, a rocking torsionally acting supporting member, a hinge member secured to said support and connected to the hinge member secured to the thresher, means associated with said hinge members whereby the torsionally acting supporting member may be rocked and oscillated, a harvester mounted on said rocking member in offset relation thereto, and means connected to said rocking supporting member between its hinge connection and its outer end for counterbalancing the weight of and sustaining the harvester in cutting condition irrespective of the vertical movements of the thresher.

14. In a machine of the class described, a thresher, a harvester, means for connecting said elements, and means between the connection of the thresher and harvester and the outer end of the latter for transposing said harvester from horizontal to edgewise position.

15. In a combination harvester-thresher, means for supporting the harvester and connected to the thresher, and means between the connection of the thresher and harvester and the outer end of the latter for rotating the support to transpose the harvester from horizontal to edgewise position.

16. In a machine of the class described, a thresher, a harvester, a support for the harvester, a coupling connecting the support to the thresher, means carried by the support for rotating the latter to transpose the harvester from horizontal to edgewise position, and means for counterbalancing the weight of said harvester while the latter is being adjusted to the height of cut.

17. In a machine of the class described, a thresher, a harvester, an axle connected to the thresher, a sleeve rockingly mounted on the axle, a harvester secured to the sleeve and adapted to be vertically adjusted when said sleeve is rocked, means for securing the axle and sleeve in fixed relation, and means on the sleeve for rotating the latter and the axle to transpose the harvester from horizontal to edgewise positions.

18. In a machine of the class described, a thresher, a harvester, an axle connected to the thresher, a sleeve rockingly mounted on the axle, a harvester secured to the sleeve and adapted to be vertically adjusted when said sleeve is rocked, and means for securing the axle and sleeve in fixed relation to transpose the harvester from horizontal to edgewise positions.

19. In a machine of the class described, a thresher, a harvester, a harvester-support extending from the thresher, a sleeve rockingly mounted on the support, and an arm connected to and adjacent each end of the sleeve and supporting the harvester to be vertically adjusted on said support.

WALLACE F. MacGREGOR.
NORMAN R. KRAUSE.